United States Patent Office 2,766,305
Patented Oct. 9, 1956

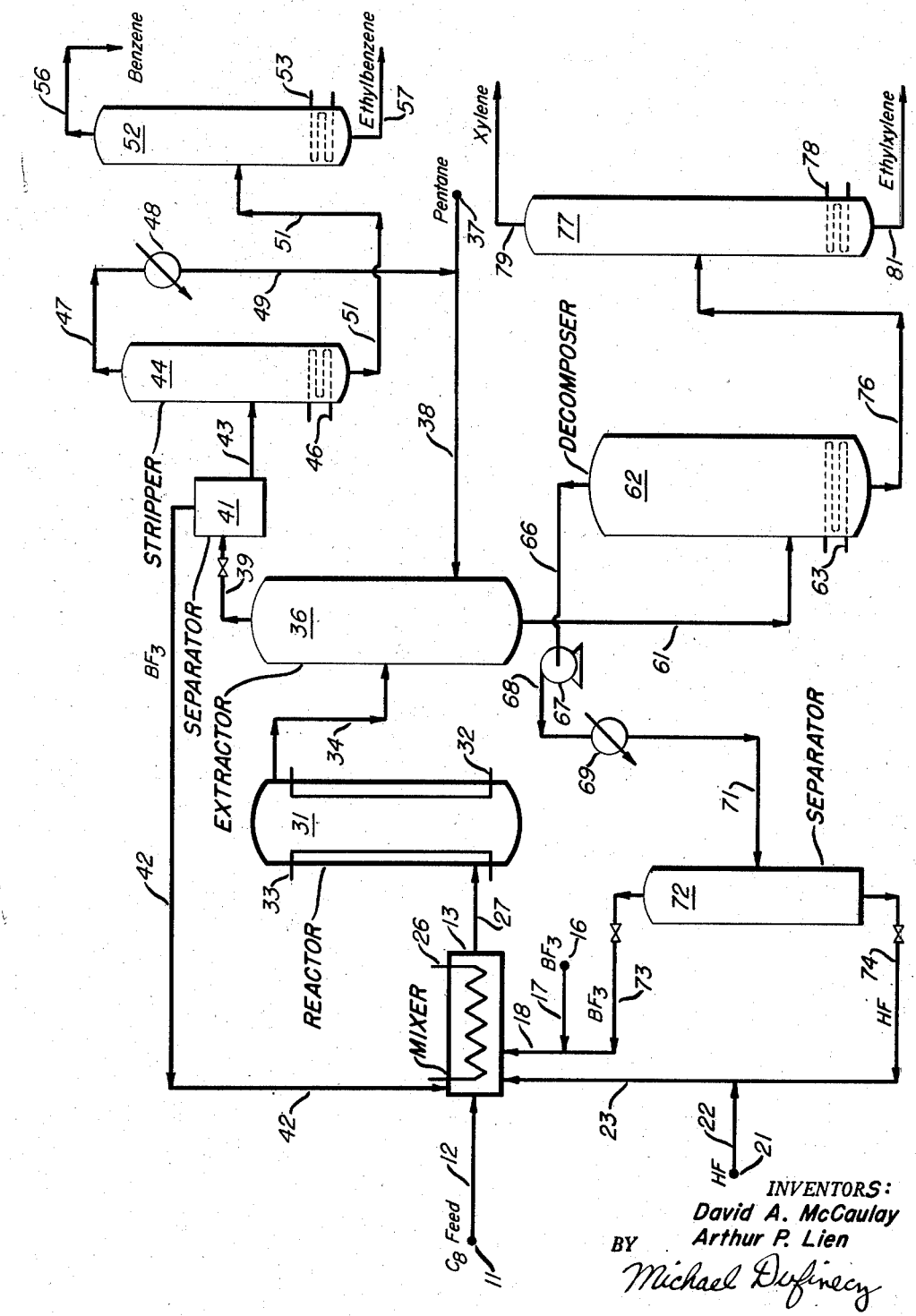

2,766,305

SEPARATION OF MIXED C$_8$ AROMATIC HYDROCARBONS INTO XYLENE AND ETHYLXYLENE

David A. McCaulay, Chicago, Ill., and Arthur P. Lien, Highland, Ind., assignors to Standard Oil Company, Chicago, Ill., a corporation of Indiana Application September 30, 1952, Serial No. 312,281

6 Claims. (Cl. 260—668)

This invention relates to the preparation of 1,3-dimethyl-5-ethylbenzene (1,3,5-ethylxylene) by the interaction of ethylbenzene and a xylene isomer. More particularly it relates to the separation of a feed comprising essentially C$_8$ aromatic hydrocarbons into a xylene fraction that is low in ethylbenzene content and a substantially pure 1,3,5-ethylxylene fraction.

While polystyrene is an excellent plastic for many uses, it has the disability of the relatively low softening point of about 90° C. Efforts to increase this softening point have resulted in the use of methylstyrene and dimethylstyrene as the monomers for the plastic formation. Recently 1,3-dimethyl-5-ethylbenzene (1,3,5-ethylxylene) has assumed importance as a source of high softening point polystyrene-type plastic.

In nature 1,3,5-ethylxylene is closely associated with the other isomeric ethylxylenes and with diethylbenzene. Owing to the fact that these aromatics have very similar boiling points, it is impractical to separate such a natural mixture by fractional distillation. The simplest method of obtaining 1,3,5-ethylxylene appears to be synthesis from other aromatic hydrocarbons.

It is an object of this invention to prepare 1,3,5-ethylxylene by the interaction of ethylbenzene and a xylene isomer. Another object is the preparation of 1,3,5-ethylxylene by the treatment of a "naturally occurring" C$_8$ aromatic hydrocarbon mixture. A particular object is the treatment of a feed comprising essentially a C$_8$ aromatic hydrocarbon mixture containing ethylbenzene and at least one xylene isomer to produce substantially pure 1,3,5-ethylxylene and a xylene fraction that is low in ethylbenzene content. A particular object is the treatment of a feed comprising essentially a mixture of ethylbenzene and isomeric xylenes to produce substantially pure 1,3,5-ethylxylene and a high purity m-xylene product fraction.

There is described in our Patent 2,661,382, issued December 1, 1953, on copending application, Serial No. 238,498, filed July 25, 1951, and entitled "Preparation of Ethylxylenes" a process for the preparation of 1,3,5-ethylxylene by the interaction of ethylbenzene and at least one xylene isomer. In that application it is asserted that substantially diethylbenzene-free ethylxylene can be obtained only by contacting a feed consisting essentially of a xylene and ethylbenzene, wherein the xylene/ethylbenzene ratio is greater than 1, with liquid HF in an amount of at least about 2 mols per mol of xylene, and with BF$_3$ in an amount between about 0.7 mol and less than 1 mol per mol of xylene in said feed at a temperature of less than 160° F. for a time sufficient to produce a 1,3,5-ethylxylene containing product. The amount of BF$_3$ is so adjusted that the liquid HF contains dissolved xylene complex, free-xylene in physical solution and dissolved ethylbenzene. It is asserted in that application that only under these conditions is it possible to avoid the formation of diethylbenzene and the production of a mixture of diethylbenzene and ethylxylene as the C$_{10}$ aromatic hydrocarbon product.

It has now been discovered that it is possible to obtain 1,3,5-ethylxylene free of diethylbenzene by reacting ethylbenzene and xylene in the presence of a defined amount of liquid HF and BF$_3$ such that no free-xylene exists in physical solution in the liquid HF.

It has been found that a critical relationship of temperature and contact time exists, which relationship permits the production of substantially pure 1,3,5-ethylxylene by the interaction of ethylbenzene and xylene even though all of said xylene is present in the contacting zone in the form of a xylene-BF$_3$-HF complex. Thus 1,3,5-ethylxylene that is free of diethylbenzene can be prepared by the interaction of ethylbenzene and a xylene wherein the mol ratio of xylene to ethylbenzene is at least 1 in the presence of at least 1 mol of BF$_3$ per mol of xylene, and a sufficient amount of liquid HF to form a single substantially homogeneous liquid phase in said reaction zone, at a temperature below about 160° F. for a time sufficient to attain an equilibrium condition of 1,3,5-ethylxylene production. A 1,3,5-ethylxylene product free of detectable amounts of diethylbenzene is separable from the mixture of hydrocarbons obtained by the removal of HF and BF$_3$ therefrom.

It has been found that the treatment of a mixture of ethylbenzene and a xylene with a sufficient amount of BF$_3$ to complex all of said xylene, i. e., 1 mol per mol of said xylene, and sufficient liquid HF to participate in the complex formation and to dissolve said complex and said ethylbenzene at a given temperature results in either (1) a mixture of diethylbenzene, xylene, benzene and ethylbenzene, or (2) a mixture of diethylbenzene, ethylxylene, xylene, benzene and ethylbenzene, or (3) a mixture of ethylxylene, xylene, benzene and ethylbenzene. The disproportionation of ethylbenzene to diethylbenzene and benzene appears to occur as a very rapid first reaction. After the formation of the diethylbenzene and its solution in the liquid HF in the form of a diethylbenzene-BF$_3$-HF complex, there occurs a very slow—depending on the temperature—interaction between diethylbenzene and xylene to form ethylxylene and ethylbenzene. By allowing a sufficiently long contacting time an equilibrium condition is attained wherein all the diethylbenzene has interacted to produce a mixture of ethylxylene, benzene, xylene and ethylbenzene.

It has further been found that an appreciable period of time exists between the formation of the diethylbenzene and the appearance of a detectable amount of ethylxylene. By taking advantage of this "induction period" it is possible to treat a mixture of C$_8$ aromatic hydrocarbons to produce essentially pure diethylbenzene and a xylene that is substantially free of ethylbenzene. This process of ethylbenzene conversion to diethylbenzene in the presence of xylenes is the subject matter of our copending application, Serial No. 312,278, filed September 30, 1952, now abandoned, and entitled "Separation of Mixed C$_8$ Aromatic Hydrocarbons into Ethylbenzene and Xylene."

In the process of this invention at least 1 mol of BF$_3$ is present in the reaction zone per mol of xylene charged to the reaction zone, i. e., sufficient BF$_3$ is present to complex all of the xylene charged. More than this minimum amount is preferred and as much as 5 mols of BF$_3$ per mol of xylene may be used. It is preferred to use between about 1.5 and 3 mols of BF$_3$ per mol of xylene charged.

The process of this invention must be carried out under substantially anhydrous conditions. The liquid HF used in the process should be substantially anhydrous, i. e., the liquid HF should contain less than 2 or 3% of water.

The amount of liquid HF present in the process must be sufficient to dissolve the complex formed and the ethylbenzene as well as to participate in the formation of the complex. It is necessary to use at least about 2 mols of liquid HF per mol of $C_8$ hydrocarbon in the feed. More than this minimum amount is desirable, e. g., as much as 50 mols. It is preferred to use in this process between about 6 and 15 mols of liquid HF per mol of $C_8$ aromatic hydrocarbon in the feed.

It has been found that the higher the temperature of contacting the shorter the contacting time necessary to produce an equilibrium 1,3,5-ethylxylene condition in the substantial absence of diethylbenzene. Temperatures as high as 200° F. may be used if the contact time is shortened, preferably if the reaction is halted by a quenching operation in order to avoid side reactions such as hydrogen transfer. In general the practical maximum upper temperature limit is about 160° F. Temperatures below ambient may be used if the necessarily prolonged contacting time is tolerable. For example, suitable contacting times at various temperatures are: 60° F., about 50 hours; 100° F., about 6 hours; 120° F., about 3 hours; 150° F., about 30 minutes.

It is preferred to operate at a temperature between about 120° and 150° F. for a time between about 3 hours and about 30 minutes, where the longer times correspond to the lower temperatures. This preferred temperature-time relationship appears to give reasonable reaction times with the least amount of side reactions.

It is to be understood that the reaction is an equilibrium phenomenon and that even at high temperature and long contacting time some ethylbenzene will remain unconverted. At the preferred conditions of liquid HF and $BF_3$ usage and the preferred temperature-time relationship, about 90% of the ethylbenzene in a feed comprising essentially ethylbenzene and xylene will be converted to 1,3,5-ethylxylene. The unconverted ethylbenzene normally will be recovered along with the xylene. However, when operating on a naturally occurring $C_8$ aromatic hydrocarbon mixture such as a hydroformate or a platformate cut, the product xylene fraction will be low in ethylbenzene and usually will be a high purity xylene, i. e., the xylene fraction will contain about 5% or less of ethylbenzene.

Substantially liquid HF-insoluble hydrocarbons such as paraffins and naphthenes readily wash ethylbenzene out of solution from complex-containing liquid HF. A "close-boiling" mixture of $C_8$ aromatic hydrocarbons and non-aromatic hydrocarbons such as is obtained by distillation of a hydroformate will normally contain about 50 volume percent of nonaromatic hydrocarbons such as paraffins, naphthenes and olefins in addition to small amounts of organic sulfur compounds. By superfractionation it is possible to obtain a $C_8$ aromatic hydrocarbon concentrate which contains on the order of 90% of aromatic hydrocarbons consisting of ethylbenzene, xylene isomers and minor amounts of $C_9$ aromatic hydrocarbons. When a $C_8$ aromatic hydrocarbon feed such as is described in this paragraph is contacted with a sufficient amount of liquid HF and at least about 1 mol of $BF_3$ per mol of aromatic hydrocarbon in the feed, a raffinate phase and an extract phase are formed. The raffinate phase contains essentially all the non-aromatic hydrocarbons. It has been found that regardless of the amount of contacting carried out between the raffinate phase and the extract phase considerable amounts of ethylbenzene will be present in the raffinate phase.

Even when treating a feed containing as little as 10 volume percent of non-aromatic hydrocarbons between about 20 and 30% of the ethylbenzene present in the feed will be found in the raffinate phase. Apparently the presence of non-aromatic hydrocarbons as a separate raffinate phase very adversely affects the ability of the liquid HF–$BF_3$ treating agent to convert and maintain ethylbenzene in the extract phase in the form of diethylbenzene suitable for interaction to ethylxylene. (Ethylbenzene recovery by extractive distillation processes or other extractive processes from the raffinate phase is not considered as "recoverable ethylbenzene" within the meaning of this invention.)

The presence of benzene and toluene markedly reduces the degree of conversion to ethylxylene.

The presence of dissolved non-aromatic hydrocarbons and dissolved and/or complexed organic sulfur compounds in the acid phase does not appear to adversely affect the reaction of ethylbenzene to diethylbenzene and, subsequently, to ethylxylene. The solubility of non-aromatic hydrocarbons in liquid HF is increased somewhat by the presence of an aromatic complex in the liquid HF. The concentration of complex in the liquid HF increases the amount of non-aromatic hydrocarbon soluble in said complex containing liquid HF. However, it has been found that under the conditions of liquid HF and $BF_3$ usage described above, that not more than on the order of 2–3 volume percent of non-aromatic hydrocarbons can be tolerated in the feed if operation without a raffinate phase in the contacting zone is desired. The maximum content of non-aromatic hydrocarbon will be dependent on the amount of liquid HF used and somewhat on the amount of $BF_3$ used. It is preferred to operate with a minimum of non-aromatic hydrocarbon in order to improve the purity of the xylene product fraction. The preferred feed stock to the process comprises essentially a mixture of at least one xylene isomer and ethylbenzene, i. e., the feed stock contains less than about 2 volume percent of non-aromatic hydrocarbons and the naturally occurring amounts of organic sulfur compounds.

Feed stocks obtained from the so-called hydroforming and platforming processes, i. e., hydroformates or platformates, contain some small amounts of olefins. These olefins readily alkylate some of the aromatic hydrocarbons and form alkyl aromatics which have a boiling point higher than the ethylxylene product and may be readily separated therefrom by distillation. The organic sulfur compounds present in feeds from hydroformates and platformates are readily removed from the product hydrocarbons by treatment with sulfuric acid or with anhydrous liquid HF.

The non-aromatic hydrocarbons, other than olefins, present in a mixed feed boil in about the same range as the xylene isomers. As a consequence these non-aromatic hydrocarbons are concentrated in the product xylene fraction. However, even when operating with a maximum of about 2–3 volume percent of non-aromatics in the feed, the product xylene fraction will contain 5% or less of non-aromatic hydrocarbons. This is considered a high purity xylene product and is usable in most operations requiring high purity xylene. It has been found that the close-boiling non-aromatic content can be decreased by washing of the complex containing liquid HF solution with an inert liquid hydrocarbon diluent such as butane, pentane or hexane which has a different boiling point than the desired products. The ethylxylene complex is so stable that substantially no adverse side reactions take place such as occur in the washing of a diethylbenzene - complex-containing liquid HF. Excessive amounts of wash liquid should be avoided. Suitable amounts will vary but in general between about 10 and 100 volume percent, based on feed, may be used.

Although it is preferred to operate the process using a feed stock and amounts of liquid HF and $BF_3$ such that substantially only one liquid phase is present in the contacting zone, it is to be understood that some gaseous $BF_3$ will be present under all operating conditions. In the contacting zone the term "single substantially homogeneous liquid phase" is to be understood as including (a) conditions such that only a liquid HF solution is present or (b) such that a barely detectable amount of raffinate phase is present along with the liquid HF solution.

The amount of ethylbenzene and xylene present in the reaction zone has a large effect on the yield of the desired ethylxylene. The mol ratio of xylene to ethylbenzene in the feed to the process should be at least 1 and preferably greater than 1, e. g., as much as 10. It is preferred to operate on a feed wherein the ratio of xylene to ethylbenzene is at least about 3. Normally the xylene/ethylbenzene ratio present in a naturally occurring mixed $C_8$ aromatic hydrocarbon fraction will be suitable for operation within the preferred ratios of the process. However, some unusual natural fractions have a very high ethylbenzene content; such a fraction is readily brought within the preferred operating ratio by the addition of xylene to the fraction.

The annexed drawing, which forms a part of this specification, illustrates one embodiment of this invention. The embodiment shown is schematic and many items of process equipment, such as, pumps and valves, have been omitted; these may be readily supplied by those skilled in the art.

The feed to this illustration was derived from a $C_8$ aromatic cut, boiling between 270° and 300° F., of a hydroformate. This cut contained about 12% of non-aromatic hydrocarbons. The non-aromatic hydrocarbon content was reduced to about 2 volume percent by means of an extractive distillation with phenol as the separating agent. The $C_8$ feed consists essentially of 2 volume percent of non-aromatic hydrocarbons, which includes a trace of olefins and organic-sulfur compounds (a total sulfur content of about 0.01%), less than 1 mol percent of $C_9$ aromatic hydrocarbons and the remainder $C_8$ aromatic hydrocarbons. The $C_8$ aromatic hydrocarbons consist of: ethylbenzene, 12%; o-xylene, 21%; m-xylene, 48%; and p-xylene, 19%.

The feed from source 11 is passed through line 12 into mixer 13. $BF_3$ from source 16 is passed by way of lines 17 and 18 into mixer 13; in this illustration, 2 mols of $BF_3$ per mol of xylene in mixer 13 are present therein. Substantially anhydrous liquid HF from source 21 is passed by way of lines 22 and 23 into mixer 13; in this illustration 9 mols of HF are present in mixer 13 per mol of aromatic hydrocarbon present therein.

Mixer 13 is provided with heat transfer coil 26. The complex formation is exothermic and coil 26 permits withdrawal of this heat or permits the adjusting of the temperature of the materials to the desired contacting temperature. The materials are withdrawn from mixer 13 and are passed by way of line 27 into reactor 31.

Reactor 31 is a vessel provided with heat exchangers 32 and 33 which maintain the temperature therein at the desired point. Since a single liquid phase exists in reactor 31 no agitating means are provided. The feed and liquid HF—$BF_3$ agent are maintained in reactor 31 at 150° F. for 30 minutes. The materials are passed from reactor 31 by way of line 34 into extractor 36.

Extractor 36 is an upright vessel provided with contacting means, such as, Berl saddles, Raschig rings or trays. In extractor 36, the liquid HF solution is contacted with pentane to extract unconverted ethylbenzene, benzene, uncomplexed $C_9$ aromatics and the non-aromatics. Extractor 31 is operated at about ambient temperatures by means of the use of cold pentane and a vessel size such that there exists a liquid holdup sufficient to overcome the effect of the introduction of hot HF solution. (A cooler may be inserted in line 34, if desired.) Extractor 36, reactor 31 and mixer 13 are operated at superatmospheric pressure in order to keep the HF in the liquid state. Pentane from source 37 is passed through line 38 into extractor 36, near the bottom thereof. In this illustration about 100 volume percent of pentane is added based on $C_8$ feed to the process.

The pentane-rich raffinate phase is withdrawn from the top of extractor 36 by way of valved line 39 and is passed to gas separator 41. By the use of a large excess of $BF_3$ and low extraction temperature, the loss of xylene to the raffinate phase is minimized. $BF_3$ is withdrawn from separator 41 and is cycled to mixer 13 by way of line 42, for reuse in the process. The raffinate phase is passed through line 43 into stripper 44.

Stripper 44 is a fractionating device, provided with an internal heater 46. A $BF_3$-saturated pentane fraction is taken overhead from stripper 44 and is recycled to extractor 36 by way of line 47, condenser 48 and lines 49 and 38. A pentane-free bottoms fraction is passed from stripper 44 by way of line 51 into fractionator 52.

Fractionator 52 is provided with an internal heater 53. Fractionator 52 separates an essentially pure benzene fraction overhead, which is passed to storage not shown, by way of line 56. A mixture of ethylbenzene (about 10% of that present in the feed), the close-boiling non-aromatics and some $C_9$ aromatic hydrocarbons are withdrawn as a bottoms product from fractionator 52 and sent to storage, not shown, by way of line 57. This "ethylbenzene" fraction may be used as a component of high octane gasoline or the ethylbenzene content may be recovered by an extractive distillation process.

The extracted liquid HF solution is withdrawn from the bottom of extractor 36 through line 61 and is introduced at about the mid-point of decomposer 62. Decomposer 62 is provided with an internal heater 63 and a few fractionating trays. Decomposer 62 may be operated at below the boiling point of HF or at elevated temperatures, such as 150° F. Herein, decomposer 62 is operated at a top temperature of about 70° F. under a slight vacuum, so that only HF and $BF_3$ are withdrawn overhead. The HF and $BF_3$ are passed through line 66, vacuum pump 67, line 68 into cooler 69.

In cooler 69 the HF is condensed and the liquid HF and gaseous $BF_3$ are passed through line 71 into gas separator 72. Gaseous $BF_3$ is withdrawn therefrom by way of valved line 73 and is cycled to mixer 13 through line 18. Liquid HF is withdrawn therefrom by way of valved line 74 and cycled to mixer 13 by way of line 23. The $BF_3$ gradually becomes contaminated with $H_2S$ from the decomposition of organic-sulfur compounds; occasionally $BF_3$ must be withdrawn from the system and purified by processes well known to the art.

A mixture of m-xylene, some ethylbenzene, 1,3,5-ethylxylene and some higher boiling aromatics is withdrawn from decomposer 62 and passed through line 76 into fractionator 77, provided with internal heater 78. A m-xylene fraction that contains negligible amounts of ethylbenzene and sulfur compounds is withdrawn overhead and sent to storage, not shown, by way of line 79.

This xylene fraction also contains some pentane, which can readily be removed by distillation, if desired. (Decomposer 62 can be operated to remove pentane overhead; the pentane can be separated from the HF by inserting a liquid settler in line 71.)

A bottoms fraction that consists of 1,3,5-ethylxylene and some slight amount of $C_9$ aromatic and higher boiling aromatic hydrocarbons is withdrawn and sent to storage, not shown, by way of line 81.

It may be desirable at times to accept a lower yield of ethylxylene in order to decrease contacting time or to operate at a lower temperature. For example, operation at 100° F. for a contacting time of 20 minutes will produce a $C_{10}$ aromatic product containing a large amount of m-diethylbenzene as well as the desired 1,3,5-ethylxylene. The diethylbenzene cannot be separated by distillation. The diethylbenzene, if recovered separately, can be recycled to the feed and will increase the overall yield of ethylxylene. It has been found that m-diethylbenzene can be separated from 1,3,5-ethylxylene by means of liquid HF and $BF_3$. By diluting the $C_{10}$ aromatic fraction with about an equal volume of pentane and then contacting this feed in an extraction tower with sufficient liquid HF to form an extract phase, e. g., about 6–15 mols, and with 1 mol of $BF_3$ per mol of 1,3,5-ethylxylene in the feed, a raffinate phase and an extract phase are obtained. With proper use of ethylxylene reflux and about 5 theoretical extraction stages, it is possible to obtain a m-diethylbenzene product containing about 1% of ethylxylene and a 1,3,5-ethylxylene product containing about 1% of m-diethylbenzene, i. e., high purity products. This m-diethylbenzene product is then sent to mixer 13.

In order to show some of the results obtainable by the process, the following experimental runs are described.

These runs were carried out using a carbon steel reactor provided with a 1725 R. P. M. stirrer. In all runs the order of addition was: (1) feed, (2) liquid HF, and (3) BF₃. The contents of the reactor were brought to the desired temperature and were agitated for the desired contacting time. At the completion of the contacting time the stirring was stopped and the contents permitted to settle for about 10 minutes. The contents of the reactor were withdrawn in such a manner that two liquid phases (if any existed therein) were withdrawn into separate receivers. The liquid phase(s) was withdrawn into a copper vessel filled with crushed ice. The decomposition of the complexes by the water resulted in the formation of a lower aqueous layer and an upper hydrocarbon layer. The hydrocarbon layer was washed with dilute aqueous caustic to remove HF and BF₃ remaining therein and then water washed to remove traces of the aqueous caustic.

The product hydrocarbons were fractionated in a laboratory column providing about 30 theoretical plates. The narrow cuts were analyzed by a combination of specific gravity, boiling point, refractive index, ultraviolet and infrared techniques.

Runs were made to determine the effect of the amount of $BF_3$ used, contacting time and presence of sufficient amount of non-aromatic hydrocarbons to form a separate hydrocarbon phase, i. e., raffinate phase, while other conditions were held relatively constant. The results obtained in these Runs I through III are shown in the table 1.

TABLE 1

| Run No | I | II | III | | |
|---|---|---|---|---|---|
| Temperature, °F | 68 | 145 | 75 | | |
| Contacting Time, Minutes | 90 | 30 | 30 | | |
| Reactor Charge, Mols: | | | | | |
| m-xylene | | 2.41 | 0.82 | | |
| p-xylene | 1.22 | | 0.81 | | |
| ethylbenzene | 1.22 | 0.83 | 0.81 | | |
| n-heptane (Vol. Percent on feed) | None | None | (50%) | | |
| HF | 30.0 | 22.5 | 30.0 | | |
| BF₃ | 2.59 | 3.34 | 2.7 | | |
| Molar Ratios: | | | | | |
| HF/aromatics | 12.3 | 7.0 | 12.3 | | |
| BF₃/xylene | 2.12 | 1.39 | 1.66 | | |
| BF₃/aromatics | 1.06 | 1.03 | 1.11 | | |
| | | | | (Mols) | (Percent) Total |
| | | | Raff. | Ext. | |
| Product Distribution, Mol Percent: | | | | | |
| Benzene | 22.1 | 19.7 | 0.12 | 0.10 | 9.0 |
| m-xylene | 37.7 | 54.0 | 0.06 | 1.05 | 45.4 |
| p-xylene | 9.8 | | 0.37 | 0.11 | 19.6 |
| ethylbenzene | 12.3 | 3.4 | 0.36 | 0.07 | 17.5 |
| diethylbenzene [1] | 17.6 | | | 0.17 | 6.9 |
| ethylxylene [2] | 1.2 | 22.9 | | 0.02 | 0.8 |
| C₁₂ aromatics | | | | 0.02 | 0.8 |
| Ethylbenzene Conversion, Percent | 75 | 87 | | (85) | 50 |

[1] Within experimental error, 100% meta-isomer.
[2] Within experimental error, 100%, 1,3-dimethyl-5-ethylbenzene.

Run I shows that when using a xylene/ethylbenzene ratio of 1, and about 2 mols of BF₃ per mol of xylene, a contacting time of 90 minutes at 68° F. resulted in only a very low yield of ethylxylene. Under these conditions the conversion of ethylbenzene was relatively low. Also of interest is the fact that about 80% of the p-xylene was converted either to ethylxylene or was isomerized to m-xylene. Within experimental error the diethylbenzene and ethylxylene product fractions consisted of 1,3-diethylbenzene, i. e., the meta-isomer and the 1,3-dimethyl-5-ethylbenzene isomer of ethylxylene.

Run II shows the effect of operating at high temperature in regard to the production of an ethylxylene fraction which contains no detectable amount of diethylbenzene. The contacting time of 30 minutes used in this run is believed to be longer than necessary for the attaining of equilibrium conditions. The xylene/ethylbenzene ratio of 3 markedly improved the ethylbenzene conversion over Run I.

Run III is presented to show the effect of a non-aromatic hydrocarbon diluent on both the direction of the reaction and the overall yields. The data show that with 50% of n-heptane, based on feed, present in the feed, two liquid phases existed in the reactor. The distribution of aromatic hydrocarbons in the raffinate phase show that almost 50% of the ethylbenzene passed into the raffinate phase as well as about 25% of the xylene in the feed. This latter in spite of the fact that a considerable excess of BF₃ over the theoretical 1 mol per mol of xylene was present in the reactor. Further, it is of interest that more than half the benzene produced in the reaction passed into the raffinate phase.

Further, Run III shows that under these conditions a side reaction leading to the formation of C₁₂ aromatics, predominantly triethylbenzene, took place. Further, the results show that despite the fact that 85% of the ethylbenzene in the extract phase was converted, the overall conversion was only 50%.

In order to determine the solubility of non-aromatic hydrocarbons in complex-containing liquid HF, two runs were made. In these runs the aromatic hydrocarbon chosen was mesitylene, since it forms a very stable complex with HF and BF₃. The non-aromatic hydrocarbon in these runs was n-heptane.

Run IV

In this run 170 ml. (1.22 mols) of mesitylene and 25 ml. of n-heptane were contacted with 25 mols of liquid HF and 1.03 mols of BF₃ for 45 minutes at 70° F. The contents of the reactor were settled for 60 minutes and then withdrawn. Two phases were present in the reactor.

The hydrocarbons recovered from the raffinate phase consisted of 21.3 ml. of n-heptane and 13.5 ml. of mesitylene. The hydrocarbons from the extract phase consisted of 3.7 ml. of n-heptane and 156.5 ml. of mesitylene (1.13 mols). Thus the extract hydrocarbons contained 2.4 volume percent of non-aromatic hydrocarbon. It is of interest that there was present in the extract phase 0.1 mol of mesitylene more than the theoretical amount of 1.03 mols. (It has been found that 1 mol of mesitylene and 1 mol of BF₃ are present in a mesitylene-BF₃-HF complex.)

Run V

This run was carried out to see if a feed corresponding to the extract hydrocarbons of Run IV could be treated to form a single liquid phase. Thus 171 ml. (1.23 mols) of mesitylene and 3.7 ml. of n-heptane were contacted with 25 mols of liquid HF and 1.03 mols of BF₃ under the same conditions as described in Run IV. When the contents of the reactor were withdrawn only a single phase was found to be present therein. Thus it was possible to form a single liquid phase by treating a feed consisting of 2.1 volume percent of non-aromatic hydrocarbon and the remainder polyalkyl aromatic hydrocarbon by the use of only 0.85 mol of BF₃ per mol of aromatic hydrocarbon in the feed. The solubility of mesitylene in liquid HF alone is about 3 volume percent. Thus about 15 ml. of mesitylene could be dissolved in addition to the amount complexed. Thus about 16 ml. of mesitylene were brought into solution through the solubilizing action of the complex. Heptane is substantially insoluble in liquid HF alone so that virtually the entire amount dissolved in the complex containing liquid HF is due to the solubilizing action of the complex.

Thus having described the invention, what is claimed is:

1. A process for the treatment of a feed mixture consisting of $C_8$ aromatic hydrocarbons containing ethylbenzene and at least one xylene wherein the xylene/ethylbenzene mol ratio is between at least 1 and about 10 to produce 1,3,5-ethylxylene as essentially the only $C_{10}$ aromatic hydrocarbon and a product xylene fraction low in ethylbenzene, which process comprises contacting said feed with between at least 1 and about 5 mols of $BF_3$ per mol of xylene in said feed and with between about 2 and 50 mols of liquid HF per mol of aromatic in said feed, at a temperature below about 160° F. for a time about sufficient to attain an equilibrium condition in the formation of 1,3,5-ethylxylene, removing HF and $BF_3$ to recover a mixture of hydrocarbons, and separating $C_{10}$ aromatic hydrocarbon fraction consisting of essentially pure 1,3,5-ethylxylene from said mixture.

2. The process of claim 1 wherein said feed consists of a natural mixture of $C_8$ aromatic hydrocarbons and not more than about 2 volume percent of non-aromatic hydrocarbons.

3. The process of claim 1 wherein the xylene/ethylbenzene ratio in said feed is between about 3 and 6.

4. The process of claim 1 wherein said contacting is carried out between about 60° and 150° F. for a time between about 30 minutes and 50 hours, the longer times corresponding to the lower temperatures.

5. A process for the treatment of a $C_8$ aromatic hydrocarbon fraction to produce a 1,3,5-ethylxylene product and a m-xylene product that is essentially ethylbenzene-free, which process comprises contacting a feed consisting of ethylbenzene, xylene isomers and not more than about 2 volume percent of close-boiling non-aromatic hydrocarbons wherein the mol ratio of xylenes to ethylbenzene is greater than about 3, with between about 1.5 and 3 mols of $BF_3$ per mol of xylene in said feed and with between about 6 and 15 mols of liquid HF per mol of aromatic hydrocarbon in said feed, at a temperature between about 120° and 150° F. for a time between about 30 minutes and 5 hours, the longer times corresponding to the lower temperatures to produce a liquid HF solution containing complexed m-xylene and 1,3,5-ethylxylene, unconverted ethylbenzene, benzene and said non-aromatics, extracting said solution with sufficient inert hydrocarbon diluent boiling outside the xylene and ethylxylene range to remove substantially all of said benzene, said unconverted ethylbenzene and said non-aromatics, removing HF and $BF_3$ from said extracted solution to recover a mixture of hydrocarbons, and separating therefrom a xylene boiling range fraction that is substantially free of ethylbenzene and xylenes other than m-xylene and a $C_{10}$ aromatic hydrocarbon fraction that is substantially free of isomers other than 1,3,5-ethylxylene.

6. The process of claim 1 wherein the temperature of contacting and the time of contacting necessary in order to obtain substantial equilibrium in the production of ethylxylene are related as follows:

| Temperature, ° F.: | Time, hours |
|---|---|
| 100 | 6 |
| 120 | 3 |
| 150 | 0.5 |

References Cited in the file of this patent

UNITED STATES PATENTS

| | | |
|---|---|---|
| 2,394,905 | Frey | Feb. 12, 1946 |
| 2,396,966 | Passino | Mar. 19, 1946 |
| 2,408,753 | Burk | Oct. 8, 1946 |
| 2,521,444 | Brooke et al. | Sept. 5, 1950 |
| 2,563,826 | Elwell et al. | Aug. 14, 1951 |
| 2,564,073 | Lien et al. | Aug. 14, 1951 |